US009700877B2

(12) United States Patent
Kim et al.

(10) Patent No.: US 9,700,877 B2
(45) Date of Patent: *Jul. 11, 2017

(54) METAL-CARBON HYBRID COMPOSITE HAVING NITROGEN-DOPED CARBON SURFACE AND METHOD FOR MANUFACTURING THE SAME

(71) Applicant: KOREA INSTITUTE OF ENERGY RESEARCH, Daejeon (KR)

(72) Inventors: Hee-Yeon Kim, Daejeon (KR); Guk-Hyeon Kwon, Gyeongsangbuk-do (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,816

(22) Filed: Jun. 1, 2015

(65) Prior Publication Data

US 2015/0343428 A1 Dec. 3, 2015

(30) Foreign Application Priority Data

Jun. 2, 2014 (KR) ........................ 10-2014-0067129

(51) Int. Cl.
*B01J 27/24* (2006.01)
*B01J 37/08* (2006.01)
(Continued)

(52) U.S. Cl.
CPC .......... *B01J 27/24* (2013.01); *B01J 35/0006* (2013.01); *B01J 35/026* (2013.01);
(Continued)

(58) Field of Classification Search
CPC ... B01J 23/00; B01J 23/28; B01J 23/30; B01J 23/44; B01J 23/6525; B01J 23/6527;
(Continued)

(56) References Cited

U.S. PATENT DOCUMENTS

| 5,876,503 | A | * | 3/1999 | Roeder | .................. | C23C 16/40 |
|---|---|---|---|---|---|---|
| | | | | | | 118/715 |
| 8,969,234 | B2 | * | 3/2015 | Kim | ...................... | H01M 4/923 |
| | | | | | | 427/115 |

(Continued)

FOREIGN PATENT DOCUMENTS

| JP | 60265365 | 11/1985 |
|---|---|---|
| JP | 63264191 | 10/1988 |

(Continued)

OTHER PUBLICATIONS

Geng et al.; Applied Surface Science; 257 (2011) 9193-9198 ; 7 Pages.

(Continued)

*Primary Examiner* — Patricia L Hailey
(74) *Attorney, Agent, or Firm* — Mark E. Bandy; Rankin, Hill & Clark LLP

(57) ABSTRACT

Disclosed are a metal-carbon hybrid composite having a nitrogen-doped carbon surface and a method of manufacturing the same. More particularly, the present invention relates to a method of manufacturing a metal-carbon hybrid composite, wherein the surface of carbon for the metal-carbon hybrid composite may be doped with nitrogen in a single step using a co-vaporization process, and to a metal-carbon hybrid composite having a nitrogen-doped carbon surface manufactured by the method.

14 Claims, 4 Drawing Sheets

(51) Int. Cl.
*B01J 35/00* (2006.01)
*H01M 4/86* (2006.01)
*B01J 35/02* (2006.01)
*B01J 37/02* (2006.01)
*H01M 4/92* (2006.01)
*H01M 8/1004* (2016.01)
*H01M 4/90* (2006.01)

(52) U.S. Cl.
CPC ........... *B01J 37/0238* (2013.01); *B01J 37/08* (2013.01); *H01M 4/8652* (2013.01); *H01M 4/92* (2013.01); *H01M 4/923* (2013.01); *H01M 8/1004* (2013.01); *H01M 4/9041* (2013.01)

(58) Field of Classification Search
CPC .... B01J 23/755; B01J 23/883; B01J 23/8871; B01J 23/8885; B01J 23/892; B01J 23/894; B01J 12/00; B05D 5/12; B05D 3/02; C23C 14/00
USPC ....... 502/184, 185, 200, 304, 305, 313, 315, 502/321; 427/115, 122–125, 212, 216, 427/220, 226, 228, 248.1, 249.1, 250, 427/255.11, 255.23, 255.25, 255.26, 427/255.394, 372.2
See application file for complete search history.

(56) References Cited

U.S. PATENT DOCUMENTS

| | | | | |
|---|---|---|---|---|
| 9,114,387 B2 * | 8/2015 | Kim | ................ | B01J 23/892 |
| 9,175,385 B2 * | 11/2015 | Kim | ................ | C23C 16/30 |
| 2004/0253374 A1 * | 12/2004 | Jung | ................ | B82Y 30/00 |
| | | | | 427/213 |
| 2010/0048380 A1 * | 2/2010 | Calabrese Barton | . | H01M 4/881 |
| | | | | 502/5 |
| 2011/0287174 A1 * | 11/2011 | Calabrese Barton | ................ | H01M 4/8807 |
| | | | | 427/115 |
| 2012/0252662 A1 | 10/2012 | Assmann et al. | | |
| 2013/0157838 A1 * | 6/2013 | Viswanathan | ........... | B01J 27/24 |
| | | | | 502/5 |
| 2014/0087939 A1 * | 3/2014 | Kim | ................ | B01J 37/0244 |
| | | | | 502/185 |

FOREIGN PATENT DOCUMENTS

| | | | | |
|---|---|---|---|---|
| JP | 2005008960 | | 1/2005 | |
| JP | 2005530671 | | 10/2005 | |
| JP | 2007182375 | | 7/2007 | |
| JP | 2013513730 | | 4/2013 | |
| JP | 2014065033 | | 4/2014 | |
| KR | 1020120070973 | | 2/2012 | |
| KR | 1020120095423 | | 8/2012 | |
| KR | 1020130036809 | | 4/2013 | |
| KR | 1020130122102 | | 7/2013 | |
| KR | 10-1381646 | * | 4/2014 | ............ C01G 55/00 |
| KR | 1020140054784 | | 9/2014 | |
| WO | 2014057612 | | 4/2014 | |

OTHER PUBLICATIONS

Zhang et al.; Thin Solid Films; 520 (2012) 6850-6855; 3 Pages.
Chen et al. Chemical Engineering Journal; 156 (2010) 404-410; 2 Pages.
Korean Office Action dated Jun. 19, 2015; No. 10-2014-0067129 (5 pages).
Seiji Obata et al.; Molecular Adsorption Characteristics of Pristine and Nitrogen Doped Graphene; 26pJB-4; 2 Grad. Sch. Frontier Sci., Univ. of Tokyo; 2 Pages.
Seiji Obata et al; Structural analysis of Nitrogen doped graphene synthesized in NH3 atmosphere; 28pTA-3; Graduated School of Science, University of Tokyo; 2 Pages.

* cited by examiner

METAL-CARBON HYBRID COMPOSITE HAVING NITROGEN-DOPED CARBON SURFACE AND METHOD FOR MANUFACTURING THE SAME

BACKGROUND OF THE INVENTION

1. Field of the Invention

The present invention relates to a metal-carbon hybrid composite having a nitrogen-doped carbon surface and a method of manufacturing the same. More particularly, the present invention relates to a method of manufacturing a metal-carbon hybrid composite, wherein the surface of carbon for the metal-carbon hybrid composite may be doped with nitrogen in a single step using a co-vaporization process, and to a metal-carbon hybrid composite having a nitrogen-doped carbon surface manufactured by the method.

2. Description of the Related Art

With the typical goal of doping a carbon material with nitrogen, ammonia (gas or liquid) or pyridine (liquid) containing nitrogen is used as a gas or liquid precursor. Specifically, a carbon material such as carbon nanotubes, graphite or graphene is synthesized and then doped with nitrogen under conditions of high temperature and high pressure by the addition of a nitrogen compound. For example, as disclosed in Applied Surface Science 257 (2011) 9193-9198 by Geng et al., the surface of graphene, obtained by treating graphite oxide slurry at 1050° C., is treated at 900° C. so as to be doped with nitrogen, and as disclosed in Thin Solid Films 520 (2012) 6850-6855 by Zhang et al., nitrogen-doped graphene is synthesized by heating a mixed solution of ethanol (70%) and ammonia (30%) to 800° C. or higher. In addition, as disclosed in Chemical Engineering Journal 156 (2010) 404-410 by Chen et al., the surface of carbon nanotubes (CNTs) is doped with nitrogen in such a way that $N_2$ microwave plasma is applied at 50 to 1000 W and a frequency of 2.45 GHz under 60 to 90 torr.

In lieu of expensive processes at high temperature under high pressure, which are stepwisely performed after the production of graphene as above, the present invention is intended to provide a simple and economic technique that enables the synthesis of graphene and nitrogen doping to be simultaneously carried out in a single step, without the additional costs.

SUMMARY OF THE INVENTION

Accordingly, an object of the present invention is to provide a technique for simultaneously synthesizing a metal-carbon hybrid composite having high performance and high durability and doping the surface of carbon for the composite with nitrogen in a single step, wherein metal particles are neither aggregated nor eliminated even under severe reaction conditions of high temperature, long time, or an acidic or alkaline state, and wherein elimination or corrosion of the particles does not occur under acid or alkali conditions.

A first aspect of the present invention provides a method of manufacturing a metal-carbon hybrid composite having a nitrogen-doped carbon surface, comprising: (S1) vaporizing a metal precursor in a first vaporizer, and an organic material precursor for forming a carbon skeleton and a nitrogen compound precursor in a second vaporizer; (S2) heating the reactor in which synthesis is to be carried out to a final reaction temperature; and (S3) supplying the metal precursor, the organic material precursor, and the nitrogen compound precursor, which were vaporized in S1, into the reactor in S2 via a carrier gas in a non-contact manner, and allowing them to stand for a predetermined period of time, thus synthesizing a metal-carbon hybrid composite having a nitrogen-doped carbon surface.

Hereinafter, a detailed description will be given of steps of the manufacturing method according to the present invention.

(S1)

S1 is a step of individually vaporizing a metal precursor, an organic material precursor for forming a carbon skeleton, and a nitrogen compound precursor while maintaining a predetermined temperature and an appropriate gas atmosphere.

The metal precursor may include at least one selected from the group consisting of a platinum precursor, a palladium precursor, a ruthenium precursor, a nickel precursor, a cobalt precursor, a molybdenum precursor, a gold precursor, a cerium precursor, and a tungsten precursor, but is not limited thereto, and any metal precursor may be used so long as it is vaporizable. Individual precursors have different gas conditions and vaporization temperatures, and appropriate control thereof is required.

The platinum (Pt) precursor may include at least one selected from the group consisting of (trimethyl)methylcyclopentadienyl platinum, platinum(II) acetylacetonate, tetrakis(trifluorophosphine) platinum(0), tetrakis(triphenylphosphine)platinum(0), platinum(II) hexafluoroacetylacetonate, trimethyl(methylcyclopentadienyl) platinum(IV), and (1,5-cyclooctadiene)dimethylplatinum(II).

The palladium (Pd) precursor may include at least one selected from the group consisting of palladium(II) acetate, hexafluoroacetylacetonato-palladium(II), and palladium(II) acetylacetonate.

The ruthenium (Ru) precursor may include at least one selected from the group consisting of ruthenium acetylacetonate, bis(ethylcyclopentadienyl) ruthenium(II), bis(cyclopentadienyl) ruthenium(II), and tris(2,2,6,6-tetramethyl-3,5-heptanedionato)ruthenium(III).

The nickel (Ni) precursor may include at least one selected from the group consisting of nickel(II) acetylacetonate, bis-cyclopentadienyl nickel, and tetrakis trifluorophosphine nickel.

The cobalt (Co) precursor may include at least one selected from the group consisting of cobalt(II) acetylacetonate, dicarbonylcyclopentadienyl cobalt, cobalt carbonyl, and cyclopentadienyl dicarbonyl-cobalt(I).

The molybdenum (Mo) precursor may include at least one selected from the group consisting of molybdenum hexacarbonyl, and molybdenum(V) chloride.

The gold (Au) precursor may be methyl(triphenylphosphine)gold(I).

The cerium precursor may include at least one selected from the group consisting of tetrakis(2,2,6,6-tetramethyl-3,5-heptanedionato)cerium(IV), cerium nitrate, cerium dipivaloylmethanate, and cerium(III) chloride.

The tungsten precursor may include at least one selected from the group consisting of tungsten hexacarbonyl and tungsten(IV) chloride.

The organic material precursor for forming a carbon skeleton may be a liquid precursor selected from the group consisting of methanol, ethanol, acetone, benzene, toluene, and xylene. Also, the organic material precursor for forming a carbon skeleton may be a gas precursor such as methane or acetylene. The vaporization temperature thereof has to be maintained at an optimal value, as with the metal precursor.

The nitrogen compound precursor may include at least one selected from the group consisting of ammonia and pyridine. The ammonia and pyridine may be in a liquid or gas phase. Furthermore, the nitrogen compound precursor, pyridine, may be used by being dissolved in an organic solvent such as ethanol, ether, etc. In particular, when pyridine is dissolved in ethanol or acetone, ethanol or acetone may be used as a precursor that forms a carbon skeleton via vaporization, and pyridine may be used as a precursor for nitrogen doping. As such, in order to control the concentration of nitrogen to be doped, the mixing ratio of ethanol or acetone to pyridine may be adjusted.

To synthesize the metal-carbon hybrid composite according to the present invention, any precursor in a liquid phase, a gas phase, or a solid phase may be used. In particular, to vaporize solid and liquid precursors, vaporizers are made of quartz, and are then placed in an oven maintained at a predetermined temperature, after which the flow of a carrier gas is carried out together with heating, whereby two or more precursors are vaporized and may be fed into the reactor for composite synthesis. The material for vaporizers may typically include a metal material or a vitreous material (quartz or Pyrex). Preferably useful is a vitreous material, which enables the appearance and the remaining amount of contents to be checked while maintaining a predetermined temperature and which is also stable because it does not react with precursors.

In this step, the specific vaporization conditions of the precursors are mainly dependent on the kind of selected precursor. In an embodiment of the present invention, when the platinum precursor, (trimethyl)methylcyclopentadienyl platinum, is used, it may be vaporized at a temperature of 50 to 70° C., and when the organic material precursor, acetone, is used, it may be vaporized at a temperature of 50 to 60° C. In another embodiment of the present invention, when the platinum precursor, (1,5-cyclooctadiene)dimethylplatinum (II), is used, it may be vaporized at a high temperature of 100° C. or more under the condition that it is dissolved in a solvent such as benzene.

(S2)

S2 is a step of heating the reactor in which synthesis is to be carried out so that the temperature thereof reaches a final reaction temperature.

In S2, the reactor may be heated to 400° C. or more, and is preferably heated to a temperature ranging from 400 to 2000° C. Given the above temperature range, various type of metal-carbon hybrid composite may be synthesized. The reactor may be located inside the heating furnace, and may be made of quartz. The temperature of the reactor may be adjusted by controlling the temperature of the heating furnace.

(S3)

S3 is a step of supplying the metal precursor, the organic material precursor, and the nitrogen compound precursor, which were individually vaporized in S1, into the reactor in S2 via a carrier gas in a non-contact manner, and allowing them to stand for a predetermined period of time, thus synthesizing a desired composite.

The metal precursor, the organic material precursor, and the nitrogen compound precursor, which were individually vaporized in S1, preferably have to be transported to the reactor for synthesis via the shortest distance under the condition that the precursors do not come into contact with each other.

In S3, the temperature of a connector for connecting the vaporizers to the reactor is preferably maintained at a temperature near the boiling points of the vaporized precursors. This serves to prevent the vaporized metal precursor, organic material precursor and nitrogen compound precursor from being condensed in an oven maintained at a predetermined temperature. This process may be implemented by a method for transporting reactants to the reactor in which the metal-carbon composite is to be synthesized through gas transport paths wound with a heating line. As such, the temperature of the heating line is maintained at a temperature near the boiling points of the precursors.

The vaporized precursors are preferably transported such that they come into initial contact with each other at the feed section of the reactor where the final reaction is to occur. In the case where such precursors come into contact with each other before reaching the reactor, undesired side-reactions of the precursors may take place, or the walls of transport paths may be coated with some of the precursors.

The carrier gas may be oxygen, hydrogen, argon, helium, or nitrogen gas. From the time point (reaction initiation point), at which the cocks of the vaporizers containing the precursors vaporized in S1 are opened, the reaction time is preferably maintained in the range of 5 min to 6 hr, and more preferably 30 min or longer.

In the process of synthesizing the metal-carbon hybrid composite according to the present invention, the synthesis temperature (reactor heating temperature) and the flow rate of the organic material precursor (for forming a carbon skeleton) relative to the metal precursor are adjusted, thus enabling the control of the appearance of the metal-carbon hybrid composite. As the synthesis temperature is raised, the extent of formation of the carbon skeleton into graphite may increase. On the other hand, as the synthesis temperature is decreased, the likelihood of formation of an amorphous carbon skeleton may increase. When the concentration of the fed nitrogen compound is adjusted, it is possible to control the nitrogen doping concentration of the carbon skeleton and defects thereof. Specifically, when the pure gaseous nitrogen compound having a similar concentration is vaporized through a path that is separate from the metal precursor and the organic material precursor, the nitrogen doping concentration and defect distribution may be maximally increased. On the other hand, when the nitrogen compound is diluted with an organic solvent such as ethanol, acetone, etc. and is then fed at a relatively diluted concentration into the reactor, nitrogen doping may be conducted at a sparse concentration. Hence, when the concentration of the nitrogen compound fed into the reactor is adjusted in this way, the surface structure of the metal-carbon hybrid composite may be controlled.

By the manufacturing method described above, it is possible to synthesize a metal-carbon hybrid composite in a powder phase. The metal-carbon hybrid composite may be provided in the form of a powder having a composite structure configured such that a metal is partially or completely covered with carbon such as graphite, graphene, etc. The composite structure may include a core-shell structure, an embedded structure, a capsule structure, or a coated structure, but is not limited thereto, and may include any type of composite structure. The metal-carbon hybrid composite may be utilized as a catalyst for a gas reaction, an electrode catalyst for a fuel cell, an electrode material for a secondary battery, or an electrode material for a solar cell.

A second aspect of the present invention provides a method of manufacturing a metal-carbon hybrid composite having a nitrogen-doped carbon surface, comprising: (S1) locating a support in a reactor; (S2) vaporizing a metal precursor in a first vaporizer, and an organic material precursor for forming a carbon skeleton and a nitrogen compound precursor in a second vaporizer; (S3) heating the reactor in which synthesis is to be carried out to a final reaction temperature; and (S4) supplying the metal precursor, the organic material precursor, and the nitrogen compound precursor, which were vaporized in S2, into the reactor in S3 via a carrier gas in a non-contact manner, and allowing them to stand for a predetermined period of time, thus synthesizing, as a composite loaded on the support, a metal-carbon hybrid composite having a nitrogen-doped carbon surface. The metal-carbon hybrid composite is provided with the nitrogen-doped carbon surface.

According to the present invention, the metal-carbon hybrid composite may be loaded on the support such as carbon, alumina, silica, or a metal sheet, etc.

The support may include carbon, alumina, silica, a metal sheet, and the like, and is preferably selected from the group consisting of carbon paper, activated carbon, carbon black, alumina powder, an alumina sheet, silica powder, titania powder, zeolite powder, zirconia powder, zeolite, and nickel or aluminum foil. The use of a support having a large surface area may maximize the loading effect. Particularly useful is carbon powder, alumina powder, or zeolite powder.

The carbon paper, alumina sheet, carbon black, silica, or zeolite may be porous materials.

In the manufacturing method according to the second aspect, the support is located in the reactor, and the composite is synthesized on the support, and thus the final product is a composite loaded on the support, which is different from the manufacturing method according to the first aspect. However, S2 to S4 steps remain the same as in the first aspect, and thus a detailed description thereof is omitted.

As for the metal-carbon hybrid composite loaded on the support, the composite structure may be a core-shell structure, an embedded structure, a capsule structure, or a coated structure, but is not limited thereto, and may include any type of composite structure. The metal-carbon hybrid composite may be utilized as a catalyst for a gas reaction, an electrode catalyst for a fuel cell, an electrode material for a secondary battery, or an electrode material for a solar cell.

A third aspect of the present invention provides a metal-carbon hybrid composite having a nitrogen-doped carbon surface, configured such that a metal is partially or completely covered with a carbon layer, wherein the surface of the carbon layer includes defects formed by nitrogen doping using co-vaporization.

In addition, the present invention may provide a metal-carbon hybrid composite having a nitrogen-doped carbon surface, configured such that a metal is partially or completely covered with a carbon layer and the composite is loaded on a support, wherein the surface of the carbon layer includes defects formed by nitrogen doping using co-vaporization.

The metal may include at least one selected from the group consisting of platinum, palladium, ruthenium, nickel, cobalt, molybdenum, gold, cerium, and tungsten.

The composite may have a structure such as a core-shell structure, an embedded structure, a capsule structure, or a coated structure.

The metal-carbon composite may be utilized as a catalyst for a gas reaction, an electrode catalyst for a fuel cell, an electrode material for a secondary battery, or an electrode material for a solar cell.

The support may be selected from the group consisting of carbon paper, activated carbon, carbon black, alumina powder, an alumina sheet, silica powder, titania powder, zirconia powder, zeolite, and nickel or aluminum foil.

According to the present invention, a nitrogen compound, which is conventionally doped under conditions of high temperature and high pressure, can be doped in a single step in coincidence with co-vaporization under mild conditions of room temperature and atmospheric pressure, thus effectively controlling the appearance of a metal-carbon hybrid composite.

According to the present invention, doping of a carbon skeleton with nitrogen in a single step in coincidence with synthesis of a metal-carbon composite using co-vaporization is applied, thereby easily controlling the thickness of carbon coupled with metal, porosity, and defects, ultimately widening the scope of applicability of the metal-carbon hybrid composite and making it easy to adjust the number of active reaction sites exposed on the surface of metal. For example, when a catalyst having a platinum (core)-carbon (shell) structure is synthesized and doped with a nitrogen compound, many defects are distributed in the carbon skeleton that constitutes the shell, thereby simultaneously increasing the number of active catalytic sites for the catalytic reaction and improving the durability due to the carbon shell.

Also, according to the present invention, the metal-carbon composite can be provided in the form of being loaded on any support, or can be in a powder phase. Specifically, the composite can be synthesized on the surface of a porous material, such as carbon paper, alumina material, carbon black powder, silica, or zeolite, or can be provided in the form of nanoparticles on the surface of a nickel foil, an iron (Fe) sheet, or a stainless steel sheet, and is thus available to a wide variety of applications. Specifically, the composite may be applied to a variety of catalyst materials using alumina, carbon, zeolite, silica, etc. and catalytic reactors having a channel shape such as a monolithic or honeycombed shape using such materials, and various absorbents or adsorbents for separating membranes.

Also, the metal-carbon hybrid composite according to the present invention can be applied to gaseous catalytic reactions at high temperatures. In the case where active metal having a size on the order of nanometers, which is prepared in a highly dispersed form, is used for a catalytic reaction at a high temperature of 500° C. or more, the metal component may be easily aggregated, undesirably losing the catalytic activity. However, the metal-carbon hybrid composite according to the present invention is employed under the condition that the surface of metal is coated with a porous carbon layer, the metal is partially embedded in carbon, or the metal is partially or completely covered with carbon, whereby metal aggregation at high temperature can be prevented.

Also, the present invention provides a technique (a single step process) that is effective at doping the surface of carbon with nitrogen in coincidence with the synthesis of the metal-carbon hybrid composite, whereby the manufacturing process can be simplified and the scope of applicability thereof can be increased, regardless of the kind of carbon material.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
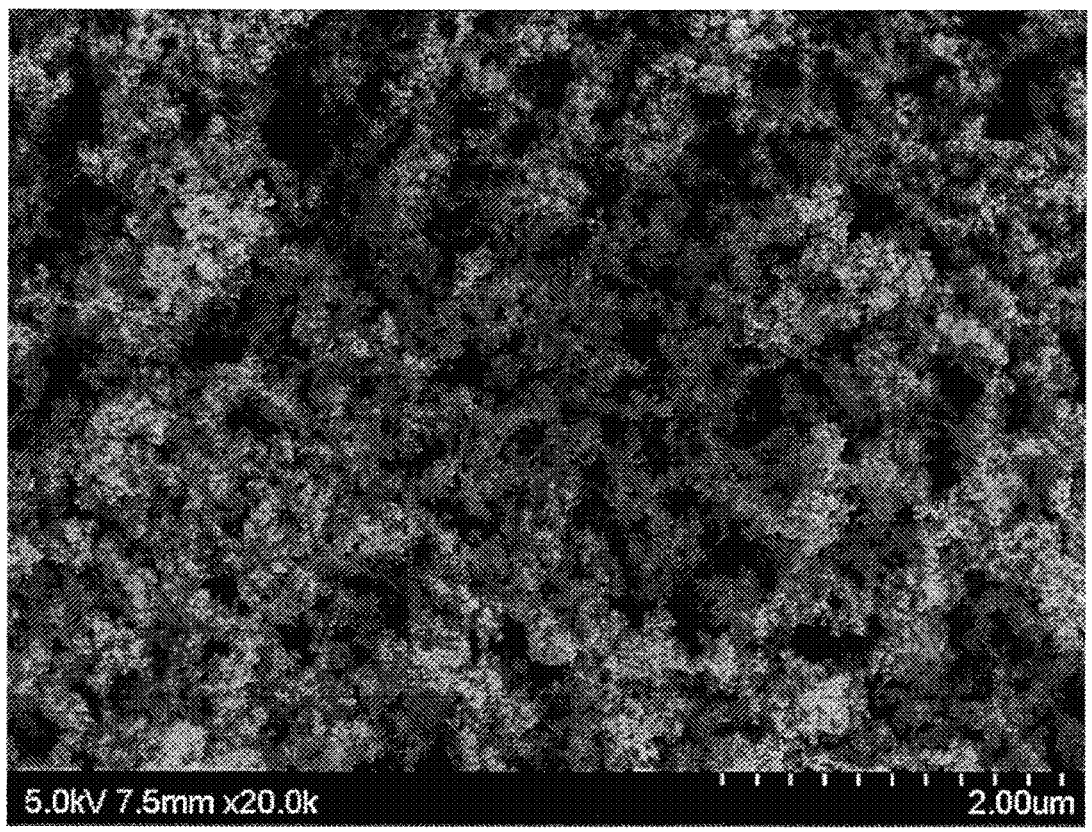
FIG. 1 illustrates the results of scanning electron microscopy (SEM) analysis of a platinum-carbon hybrid composite having a nitrogen-doped carbon surface in Example 1.

A better understanding of the present invention may be obtained via the following examples that are set forth to illustrate, but are not to be construed as limiting the present invention.

Example 1

Formation of Metal-Carbon Hybrid Composite Having Nitrogen-Doped Carbon Surface (Hybrid Composite Having Platinum Core-Porous Graphene Shell Structure)

A platinum precursor, methylcyclopentadienyl platinum (MeCpPtMe$_3$), was used, and a carbon precursor, ethanol (≥99.9%, Merck), was used. To perform doping with a nitrogen compound in coincidence with synthesis of a hybrid composite, pyridine (99.8%, Aldrich) was used by being dissolved in an amount of 5% in ethanol. Furthermore, the inside of two vaporizers individually provided in an oven to vaporize the precursors was maintained in a nitrogen atmosphere, and cocks for feeding and discharge were closed. As nitrogen was allowed to flow via a bypass line that does not pass through the vaporizers, impurities were removed from the reactor. As for the reactor in which synthesis is to be carried out, a quartz filter was disposed perpendicular to the flow of gas in a quartz tube (diameter 5 cm) used as the reactor to collect the 'metal-carbon hybrid composite having a nitrogen-doped carbon surface' to be synthesized in a single step, and graphite fiber paper (Toray, TGPH060, 30 mm×30 mm) was then disposed thereon to gather nanoparticles. While purge nitrogen was allowed to flow into the reactor for 2 hr at 110° C., moisture and impurities were removed from the reactor.

Next, the temperature of the reactor for synthesis of a metal-carbon hybrid composite was increased to 600° C. at a heating rate of 3° C./min to form the conditions for synthesis of a metal-carbon hybrid composite. When the temperature of the reactor reached the final reaction temperature (600° C.), the temperature of the first oven including the vaporizer containing the platinum precursor was increased to 60° C., and the temperature of the second oven containing the solution of pyridine (5 wt %) in ethanol was increased to 80° C.

When the temperature of each of the precursors and the reactor reached the final reaction temperature, the cocks of individual vaporizers were opened, and the vaporized precursors were transported to the reactor by means of a carrier gas. This carrier gas was nitrogen, and nitrogen was allowed to flow at 20 sccm to the line passing through the first oven containing the platinum precursor, and at 10 sccm to the line passing through the second oven containing the solution of pyridine (5 wt %) in ethanol, and nitrogen was additionally allowed to flow at 20 sccm to the reactor through an additional line. The time point when the cocks of two vaporizers were opened was taken as the reaction initiation time point, from which the reaction time was maintained for 1 hr, thereby synthesizing a hybrid composite having a metal-carbon core-shell structure.

Comparative Example 1

Formation of Metal-Carbon Hybrid Composite without Doped Nitrogen

A hybrid composite having a metal-carbon core-shell structure was manufactured in the same manner as in Example 1, with the exception that pyridine for doping with a nitrogen compound was not used.

Test Example 1: SEM Analysis

The hybrid composite having a platinum-carbon core-shell structure with doped nitrogen of Example 1 was analyzed using SEM. The results are shown in FIG. 1. As illustrated in FIG. 1, the platinum-carbon composite was synthesized in the form of being dispersed on the surface of carbon paper. The hybrid particles thus synthesized are coupled with a membrane and can thus be utilized as an MEA (membrane-electrode-assembly) for a fuel cell. Also, the powder is recovered and can then be employed as a catalyst for a gaseous catalytic reaction.

Test Example 2: TEM Analysis

Figure 2:
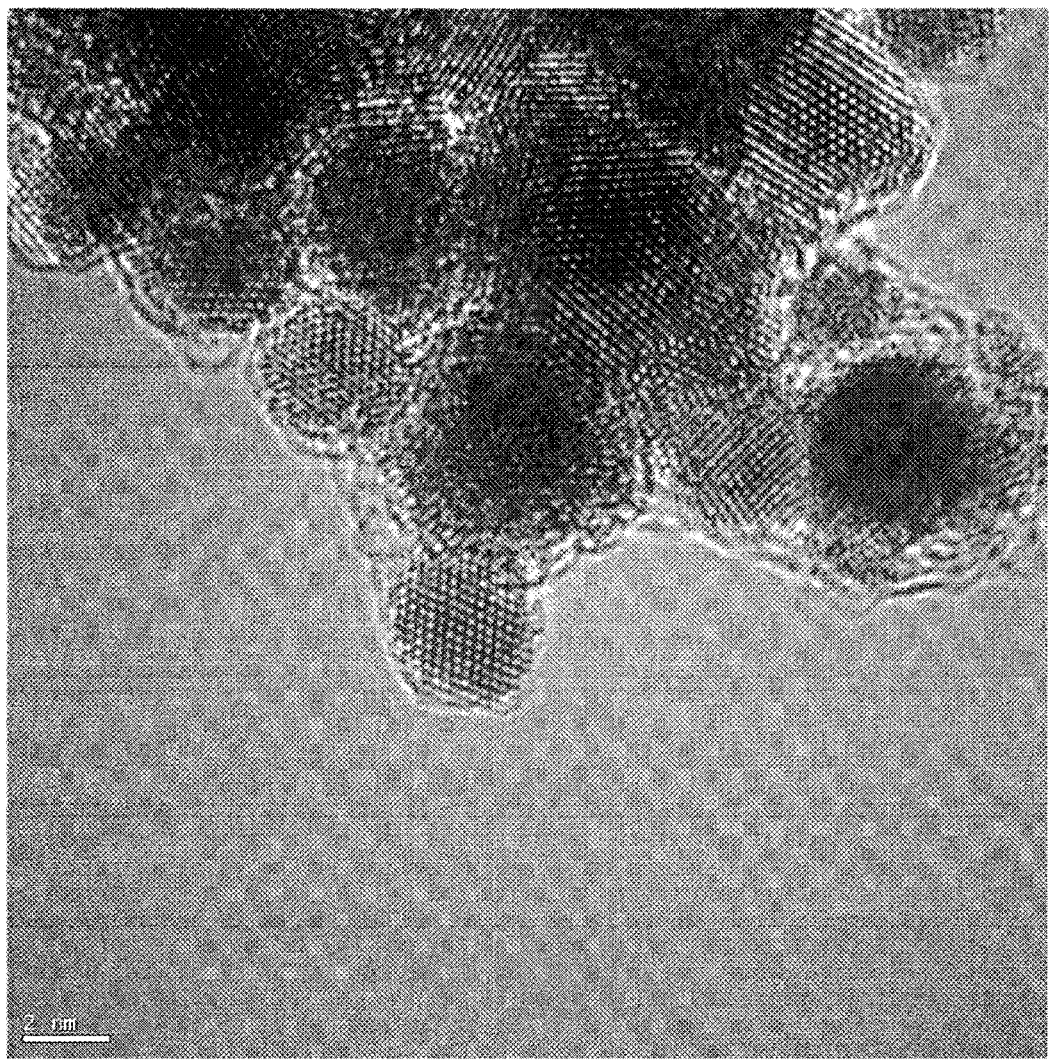
FIG. 2 illustrates the results of transmission electron microscopy (TEM) analysis of the platinum-carbon hybrid composite having a nitrogen-doped carbon surface in Example 1.
Figure 3:
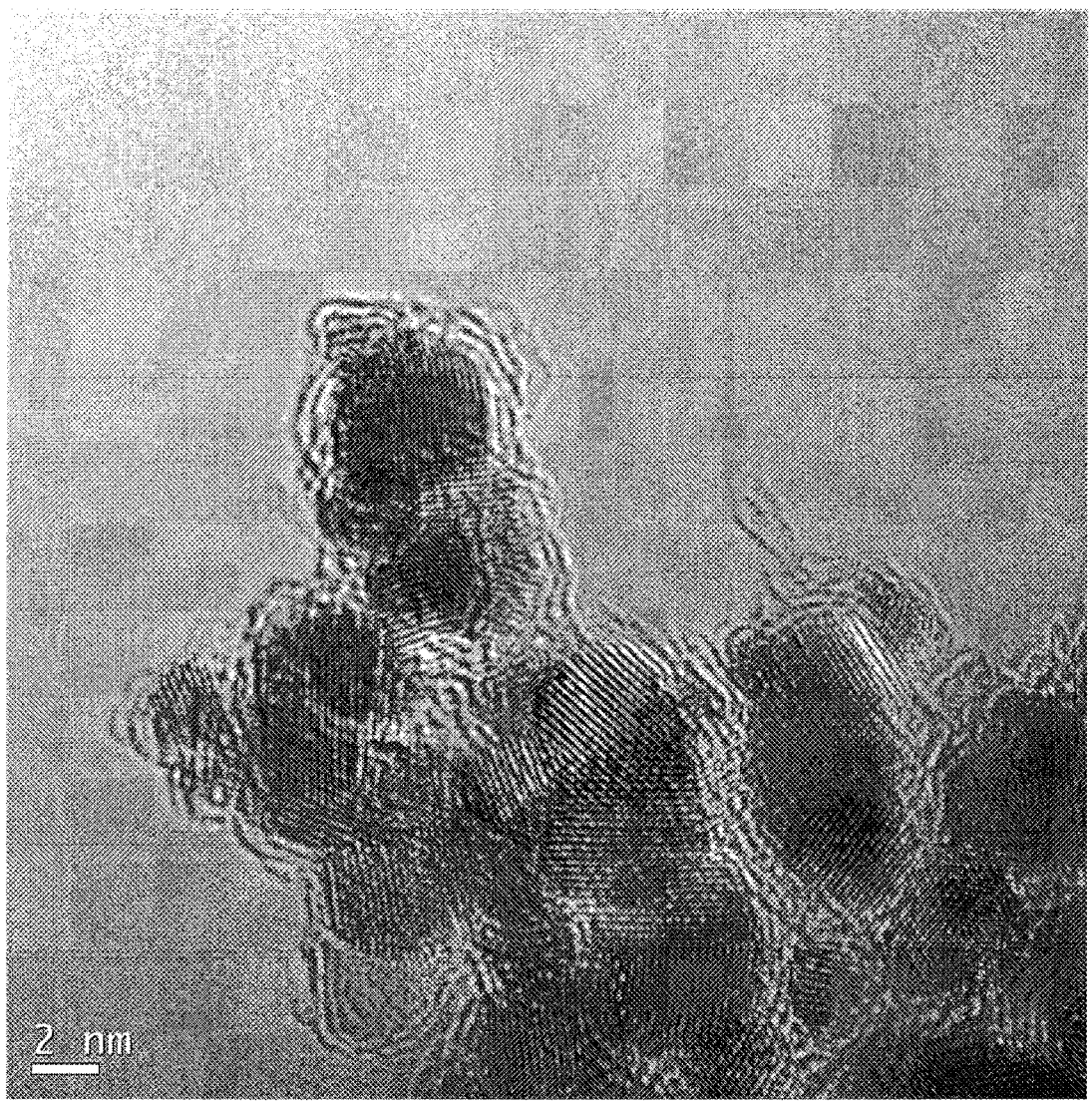
FIG. 3 illustrates the results of TEM analysis of a platinum-carbon hybrid composite without doped nitrogen in Comparative Example 1.

The hybrid composite having a platinum-carbon core-shell structure with doped nitrogen of Example 1 was analyzed using TEM. The results are shown in FIG. 2. As illustrated in FIG. 2, based on the results of the platinum-carbon hybrid composite obtained by vaporizing the platinum precursor and the solution of pyridine (5 wt %) in ethanol at a reaction temperature of 600° C. and then allowing them to flow into the reactor for 1 hr, the platinum-carbon hybrid composite was configured such that the surface of platinum particles having a size on the order of 2 to 5 nm was coated with an average of one graphene layer to form platinum-carbon core-shell particles. On the other hand, the core-shell composite without doped nitrogen was configured such that the surface of platinum particles having a similar size was coated with an average of two to four graphene layers, as illustrated in FIG. 3. It can be directly confirmed that the thickness of the shell in graphene form was decreased and the incidence of defects was increased when performing nitrogen doping.

Test Example 3: Catalytic Reaction Test

The carbon dioxide reforming reaction of methane (CO$_2$ reforming of CH$_4$) was carried out in the presence of catalysts comprising the hybrid composite having a platinum-carbon core-shell structure with doped nitrogen of Example 1 and the hybrid composite having a core-shell structure without doped nitrogen of Comparative Example 1. The reaction results were analyzed, and are shown in FIG. 4.

For the reforming reaction, the flow rates of methane and carbon dioxide were set to 30 ml/min, and the reforming reaction was carried out in the reactor maintained at 700° C. The reaction scheme is represented below.

$$CH_4 + CO_2 \rightarrow 2CO + 2H_2$$

Figure 4:
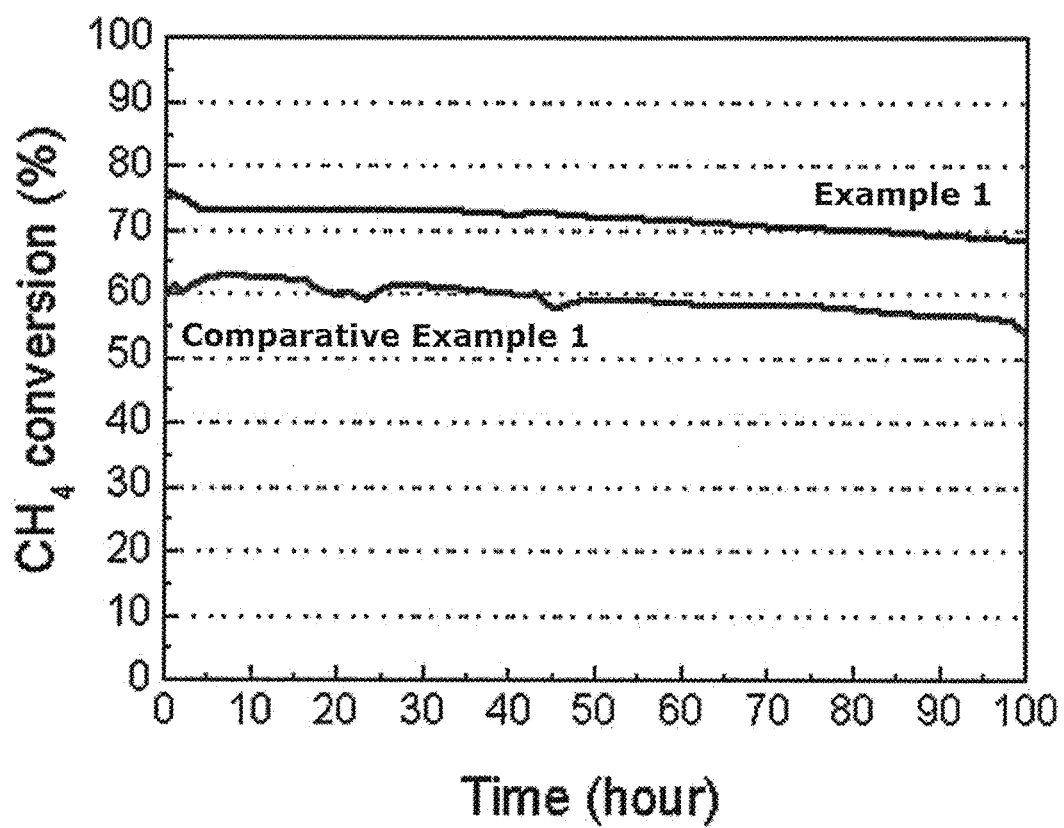
FIG. 4 illustrates the results of testing of the carbon dioxide reforming reaction of methane using the hybrid composites of Example 1 and Comparative Example 1, in which the conversion of the reactant (methane) is graphed as the reaction proceeds.

The results of the reforming reaction for 100 hr are illustrated in FIG. 4. As the catalyst, the hybrid composite having a platinum-carbon core-shell structure with doped nitrogen of Example 1 was superior by about 20% in initial reaction activity and also by about 15% in reaction activity even after 100 hr, compared to the hybrid composite having a core-shell structure without doped nitrogen of Comparative Example 1. This is because the core-shell catalyst (Example 1) wherein the carbon shell has a large amount of pores due to nitrogen doping has a relatively high number of active catalytic sites, compared to the catalyst having no doped nitrogen (Comparative Example 1, in which the carbon shell has a small amount of pores). After the lapse of the reaction time, superior activity was maintained and also durability was excellent in Example 1. This is because there was almost no catalyst aggregation during the reaction time, nor was there inactivation attributable to the formation of coke.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a metal-carbon hybrid composite having a nitrogen-doped carbon surface, comprising:
   (S1) vaporizing a metal precursor in a first vaporizer, and an organic material precursor for forming a carbon skeleton and a nitrogen compound precursor in a second vaporizer;
   (S2) heating a reactor in which synthesis is to be carried out to a final reaction temperature; and
   (S3) supplying the metal precursor and, the organic material precursor and the nitrogen compound precursor, which were vaporized in S1, into the reactor in S2 via a carrier gas in a non-contact manner, and allowing the precursors to stand for a predetermined period of time, thus synthesizing a metal-carbon hybrid composite having a nitrogen-doped carbon surface, configured such that a metal is partially or completely covered with a carbon layer, wherein a surface of the carbon layer includes defects formed by nitrogen doping using co-vaporization,
   wherein the metal precursor comprises at least one selected from the group consisting of a platinum precursor, a palladium precursor, a ruthenium precursor, a nickel precursor, a cobalt precursor, a molybdenum precursor, a gold precursor, a cerium precursor, and a tungsten precursor,
   wherein the organic material precursor for forming a carbon skeleton is a liquid precursor selected from the group consisting of methanol, ethanol, acetone, benzene, toluene, and xylene, or the organic material precursor for forming a carbon skeleton is a gas precursor selected from methane and acetylene, and
   wherein the nitrogen compound precursor comprises at least one selected from the group consisting of ammonia and pyridine.

2. The method of claim 1,
   wherein the platinum (Pt) precursor is selected from the group consisting of (trimethyl)methylcyclopentadienyl platinum, platinum(II) acetylacetonate, tetrakis(trifluorophosphine) platinum(0), platinum(triphenylphosphine) platinum(0), platinum(II) hexafluoroacetylacetonate, trimethyl(methylcyclopentadienyl) platinum(IV), and (1,5-cyclooctadiene)dimethylplatinum(II),
   the palladium (Pd) precursor is selected from the group consisting of palladium(II) acetate, hexafluoroacetylacetonato-palladium(II), and palladium(II) acetylacetonate,
   the ruthenium (Ru) precursor is selected from the group consisting of ruthenium acetylacetonate, bis(ethylcyclopentadienyl)ruthenium(II), bis(cyclopentadienyl)ruthenium(II), and tris(2,2,6,6-tetramethyl-3,5-heptanedionato)ruthenium(III),
   the nickel (Ni) precursor is selected from the group consisting of nickel(11) acetylacetonate, bis-cyclopentadienyl nickel, and tetrakis trifluorophosphine nickel,
   the cobalt (Co) precursor is selected from the group consisting of cobalt(II) acetylacetonate, dicarbonylcyclopentadienyl cobalt, cobalt carbonyl, and cyclopentadienyl dicarbonyl-cobalt(I),
   the molybdenum (Mo) precursor is selected from the group consisting of molybdenum hexacarbonyl, and molybdenum(V) chloride,
   the gold (Au) precursor is methyl(triphenylphosphine) gold(I),
   the cerium precursor is selected from the group consisting of tetrakis(2,2,6,6-tetramethyl-3,5-heptanedionato)cerium(IV), cerium nitrate, cerium dipivaloylmethanate, and cerium(III) chloride, and
   the tungsten precursor is selected from the group consisting of tungsten hexacarbonyl, and tungsten(IV) chloride.

3. The method of claim 1, wherein in S2, the reactor is heated to a temperature of 400° C. or higher.

4. The method of claim 1, wherein in S3, a temperature of a connector for connecting the vaporizers to the reactor is maintained at a temperature near boiling points of the vaporized precursors.

5. The method of claim 1, wherein the carrier gas is oxygen, hydrogen, argon, helium, or nitrogen gas.

6. A metal-carbon hybrid composite having a nitrogen-doped carbon surface manufactured by the method of claim 1, configured such that a metal is partially or completely covered with a carbon layer, wherein a surface of the carbon layer includes defects formed by nitrogen doping using co-vaporization.

7. The metal-carbon hybrid composite of claim 6, wherein the composite is provided in a core-shell structure, an embedded structure, a capsule structure, or a coated structure.

8. A method of manufacturing a metal-carbon hybrid composite having a nitrogen-doped carbon surface, comprising:
   (S1) locating a support in a reactor;
   (S2) vaporizing a metal precursor in a first vaporizer, an organic material precursor for forming a carbon skeleton and a nitrogen compound precursor in a second vaporizer;
   (S3) heating a reactor in which synthesis is to be carried out to a final reaction temperature; and
   (S4) supplying the metal precursor and, the organic material precursor, and the nitrogen compound precursor, which were vaporized in S2, into the reactor in S3 via a carrier gas in a non-contact manner, and allowing the precursors to stand for a predetermined period of time, thus synthesizing a metal-carbon hybrid composite having a nitrogen-doped carbon surface, configured such that a metal is partially or completely covered with a carbon layer, and the composite is loaded on the support, wherein a surface of the carbon layer includes defects formed by nitrogen doping using co-vaporization, wherein the metal precursor comprises at least one selected from the group consisting of a platinum precursor, a palladium precursor, a ruthenium precursor, a nickel precursor, a cobalt precursor, a molybdenum precursor, a gold precursor, a cerium precursor, and a tungsten precursor, wherein the organic material precursor for forming a carbon skeleton is a liquid precursor selected from the group consisting of methanol, ethanol, acetone, benzene, toluene, and xylene, or the organic material precursor for forming a carbon skeleton is a gas precursor selected from methane and acetylene, and wherein the nitrogen compound precursor comprises at least one selected from the group consisting of ammonia and pyridine.

9. The method of claim 8, wherein the support is selected from the group consisting of carbon paper, activated carbon, carbon black, alumina powder, an alumina sheet, silica powder, titania powder, zirconia powder, zeolite, and nickel or aluminum foil.

10. The method of claim 8, wherein in S3, the reactor is heated to a temperature of 400° C. or higher.

11. The method of claim 8, wherein the carrier gas is oxygen, hydrogen, argon, helium, or nitrogen gas.

12. A metal-carbon hybrid composite having a nitrogen-doped carbon surface manufacture by the method of claim 8, configured such that a metal is partially or completely covered with a carbon layer, and the composite is loaded on a support, wherein a surface of the carbon layer includes defects formed by nitrogen doping using co-vaporization.

13. The metal-carbon hybrid composite of claim 12, wherein the composite is provided in a core-shell structure, an embedded structure, a capsule structure, or a coated structure.

14. The metal-carbon hybrid composite of claim 12, wherein the support is selected from the group consisting of carbon paper, activated carbon, carbon black, alumina powder, an alumina sheet, silica powder, titania powder, zirconia powder, zeolite, and nickel or aluminum foil.

\* \* \* \* \*